United States Patent [19]

Rosenquist

[11] 4,454,275

[45] Jun. 12, 1984

[54] FLAME RETARDANT COPOLYESTER-CARBONATE COMPOSITIONS

[75] Inventor: Niles R. Rosenquist, Evansville, Ind.

[73] Assignee: General Electric Company, Mt. Vernon, Ind.

[21] Appl. No.: 407,129

[22] Filed: Aug. 11, 1982

Related U.S. Application Data

[63] Continuation-in-part of Ser. No. 236,591, Feb. 20, 1981, abandoned.

[51] Int. Cl.$^3$ ................................................. C08K 7/14
[52] U.S. Cl. .................................. 524/164; 524/611; 524/612; 525/146
[58] Field of Search .................... 528/193, 194, 176; 524/164, 611, 612, 94; 525/146, 165

[56] References Cited

U.S. PATENT DOCUMENTS

| | | | |
|---|---|---|---|
| 3,169,121 | 2/1965 | Goldberg | 528/194 |
| 3,671,487 | 6/1972 | Abolins | 524/411 |
| 3,940,366 | 2/1976 | Mark | 524/612 |
| 4,028,297 | 6/1977 | Webb | 524/611 |
| 4,156,069 | 5/1979 | Prevorsek et al. | 528/193 |
| 4,194,038 | 3/1980 | Baker et al. | 528/194 |
| 4,197,232 | 4/1980 | Bialous et al. | 524/164 |
| 4,223,100 | 9/1980 | Reinart | 524/611 |
| 4,330,663 | 5/1982 | Rosenquist | 528/128 |
| 4,366,276 | 12/1982 | Freitag et al. | 524/94 |

*Primary Examiner*—Lorenzo B. Hayes
*Assistant Examiner*—Kriellion Morgan
*Attorney, Agent, or Firm*—Martin B. Barancik

[57] ABSTRACT

An improved flame retardant polyester-carbonate composition comprised of an admixture of (i) an aromatic polyester-carbonate, (ii) an organic alkali metal salt of sulfonic acid or an organic alkaline earth metal salt of sulfonic acid or mixtures thereof, and (iii) a fluorinated polyolefin.

11 Claims, No Drawings

FLAME RETARDANT COPOLYESTER-CARBONATE COMPOSITIONS

RELATION TO OTHER APPLICATIONS

This application is a continuation-in-part application of copending application Ser. No. 236,591 filed Feb. 20, 1981, now abandoned.

This invention is directed to an improved flame retardant polyester-carbonate composition of an aromatic polyester-carbonate in admixture with an organic alkali metal salt of sulfonic acid or an organic alkaline earth metal salt of sulfonic acid or a mixture thereof, which composition has in admixture therewith a fluorinated polyolefin in sufficient quantity to render the polyester-carbonate composition non-dripping.

BACKGROUND OF THE INVENTION

It is known in the art to render polycarbonate resins flame retardant and non-dripping by admixing therewith an organic alkali metal salt or an organic alkaline earth metal salt of sulfonic acid, and a fluorinated polyolefin (Application Ser. No. 949,964 filed Oct. 10, 1978, now abandoned and assigned to the same assignee as the instant application). However, polyester-carbonate resins are quite different from polycarbonate resins. Thus, for example, polyester-carbonates have a higher heat distortion temperature under load (generally from about 50° F. to about 60° F. higher) than polycarbonates, and are usually more difficult to process (because of their higher intrinsic viscosity) than polycarbonates.

It is this difference in properties, especially the heat distortion temperature, that provides one of the main reasons for using polyester-carbonates in place of polycarbonates in certain applications. This is particularly true where there is a high temperature environment. In spite of the disadvantage of the more difficult processability of the polyester-carbonate resin it is still preferred over the polycarbonate resin in these applications because of its higher heat distortion temperature. However, this main advantage of polyester-carbonates makes it especially important that they be made flame retardant and non-dripping since they are used in high temperature environments where the chances of ignition and burning are increased.

It is well known to those in the field that the area of modification of the physical properties of a polymer, e.g. flame retardance, by the addition thereto of certain additives is largely an empirical art rather than a predictable science with little, if any, predictability on the effects a certain additive will have in a particular polymer system. Thus, while a particular additive may have one effect in one polymer system the same additive may well produce entirely different results when used in another and different polymer system. Likewise, two rather closely related additives may produce entirely different results when admixed with the same polymer.

The present situation is even more complicated in that two entirely dissimilar additives, i.e. (i) an organic alkali metal salt of sulfonic acid or an organic alkaline earth metal salt of sulfonic acid, and (ii) fluorinated polyolefin, are employed.

There thus exists a need for flame retardant and non-dripping aromatic polyester-carbonate resins.

DESCRIPTION OF THE INVENTION

It has surprisingly been discovered that an aromatic polyester-carbonate can be made both flame retardant and non-dripping by incorporating with the aromatic polyester-carbonate (i) an organic alkali metal salt of sulfonic acid, an organic alkaline earth metal salt of a sulfonic acid, or mixtures thereof, and (ii) a fluorinated polyolefin.

The polyester-carbonates which find use in the instant invention and the methods for their preparation are well known in the art as disclosed in U.S. Pat. Nos. 3,030,331; 3,169,121; 4,194,038 and 4,156,069 as well as in copending application Ser. No. 33,389 filed Apr. 26, 1979, now abandoned and assigned to the same assignee as the instant application, all of which are incorporated herein by reference.

The polyester-carbonates can generally be termed copolyesters containing carbonate groups, carboxylate groups, and aromatic carbocyclic groups in the polymer chain, in which at least some of the carboxylate groups and at least some of the carbonate groups are bonded directly to ring carbon atoms of the aromatic carbocyclic groups. These polyester-carbonates are, in general, prepared by reacting a difunctional carboxylic acid or a reactive derivative of the acid such as the acid dihalide, a dihydric phenol and a carbonate precursor.

The dihydric phenols useful in formulating the polyester-carbonates which are of use in the practice of the present invention are in general represented by the general formula

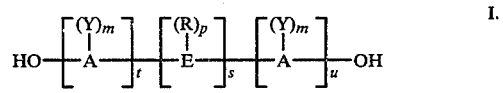

I.

wherein A represents an aromatic group such as phenylene, biphenylene, naphthylene, etc. E may be an alkylene or alkylidene group such as methylene, ethylene, propylene, propylidene, isopropylidene, butylene, butylidene, isobutylidene, amylene, isoamylene, amylidene, isoamylidene, etc. Where E is an alkylene or alkylidene group, it may also consist of two or more alkylene or alkylidene groups connected by a non-alkylene or non-alkylidene group such as an aromatic linkage, a tertiary amino linkage, an ether linkage, a carbonyl linkage, a silicon-containing linkage, or by a sulfur-containing linkage such as sulfide, sulfoxide, sulfone, etc. In addition, E may be a cycloaliphatic group (e.g., cyclopentyl, cyclohexyl, etc.); a sulfur containing linkage, such as sulfide, sulfoxide or sulfone; an ether linkage; a carbonyl group; a tertiary nitrogen group; or a silicon-containing linkage such as silane or siloxy. R represents hydrogen or a monovalent hydrocarbon group such as alkyl (methyl, ethyl, propyl, etc.), aryl (phenyl, naphthyl, etc.), aralkyl (benzyl, ethylphenyl, etc.), alkaryl, or cycloaliphatic (cyclopentyl, cyclohexyl, etc.). Y may be an inorganic atom such as halogen (fluorine, bromine, chlorine, iodine), an inorganic group such as the nitro group, an organic group such as R above, or an oxy group such as OR, it being only necessary that Y be inert to and unaffected by the reactants and reaction conditions. The letter m represents any integer from and including zero through the number of positions on A available for substitutuion; p represents an integer from and including zero through the number of positions on E available for substitution; t represents an integer equal to at least one; s is either zero or one; and u represents any integer including zero.

In the dihydric phenol compound represented by Formula I above, when more than one Y substituent is present, they may be the same or different. The same hold true for the R substituent. Where s is zero in Formula I and u is not zero, the aromatic rings are directly joined with no intervening alkylene or other bridge. The positions of the hydroxyl groups and Y on the aromatic nuclear residues A can be varied in the ortho, meta, or para positions and the groupings can be in vicinal, asymmetrical or symmetrical relationship, where two or more ring carbon atoms of the hydrocarbon residue are substituted with Y and hydroxyl groups.

Some nonlimiting examples of dihydric phenols falling within the scope of Formula I include:
2,2-bis(4-hydroxyphenyl)propane (bisphenol A);
2,4'-dihydroxydiphenylemethane;
bis(2-hydroxyphenyl)methane;
bis(4-hydroxyphenyl)methane;
bis(4-hydroxy-5-nitrophenyl)methane;
bis(4-hydroxy-2,6-dimethyl-3-methoxyphenyl)methane;
1,1-bis(4-hydroxyphenyl)ethane;
1,1-bis(4-hydroxy-2-chlorophenyl)ethane;
2,2-bis(3-phenyl-4-hydroxyphenyl)propane;
bis(4-hydroxyphenyl)cyclohexylmethane; and
2,2-bis(4-hydroxyphenyl)-1-phenylpropane.

These dihydric phenols may be used alone or as mixtures of two or more different dihydric phenols.

In general, any difunctional carboxylic acid or its reactive derivative such as the acid dihalide conventionally used in the preparation of polyesters may be used for the preparation of the polyester-carbonates useful in formulating the flame retardant non-dripping compositions of the present invention. In general, the carboxylic acids which may be used are aliphatic carboxylic acids, aliphatic-aromatic carboxylic acids, or aromatic carboxylic acids. The aromatic dicarboxylic acids or their reactive derivatives such as the aromatic acid dihalides are preferred as they produce the aromatic polyester-carbonates which are most useful in the practice of the present invention.

These carboxylic acids may be represented by the general formula

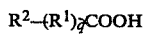  II.

wherein $R^1$ represents an alkylene, alkylidene or cycloaliphatic group in the same manner as set out above for E in Formula I; an alkylene, alkylidene or cycloaliphatic group containing ethylenic unsaturation; an aromatic radical such as phenylene, nathylene, biphenylene, substituted phenylene, etc.; two or more aromatic groups connected through non-aromatic linkages such as those defined by E in formula I; or an aralkyl radical such as tolylene, xylene, etc. $R^2$ is either a carboxyl or a hydroxyl group. The letter q represents one where $R^2$ is a hydroxyl group and either zero or one wherein $R^2$ is a carboxyl group. Thus the difunctional acid will either be a monohydroxy monocarboxylic acid or a dicarboxylic acid. For purposes of the present invention the dicarboxylic acids or their reactive derivatives such as the acid dihalides are preferred, with the aromatic dicarboxylic acids or their dihalides being more preferred. Thus, in these more preferred acids $R^2$ is a carboxyl group and $R^1$ is a divalent aromatic radical such as phenylene, naphthylene, biphenylene, substituted phenylene, etc.; two or more aromatic groups connected through non-aromatic linkages; or a divalent aralkyl group. Some nonlimiting examples of suitable preferred aromatic and aliphatic-aromatic dicarboxylic acids which may be used in preparing the polyester-carbonates useful in the practice of the present invention include phthalic acid, isophthalic acid, terephthalic acid, homophthalic acid, o-, m-, and p-phenylenediacetic acid; the polynuclear aromatic acids such as diphenic acid, and 1,4-naphthalic acid.

These acids may be used either individually or as a mixture of two or more different acids.

The carbonate precursor may be a carbonyl halide, a carbonate ester or a haloformate. The carbonyl halides which can be employed herein are carbonyl chloride, carbonyl bromide and mixtures thereof. Typical of carbonate esters which may be employed herein are diphenyl carbonate, di(halophenyl)carbonates such as di(chlorophenyl)carbonate, di(bromophenyl)carbonate, di(trichlorophenyl)carbonate, di(tribromophenyl)carbonate, etc.; di(alkylphenyl)carbonates such as di(tolyl)carbonate, etc., di(naphthyl)carbonate, di(chloronaphthyl)carbonate, phenyl tolyl carbonate, chlorophenyl chloronaphthyl carbonate, etc., or mixtures thereof. The haloformates suitable for use herein include bishaloformates of dihydric phenols (bischloroformates of hydroquinone, etc.) or glycols (bishaloformates of ethylene glycol, neopentyl glycol, polyethylene glycol, etc.). Carbonyl chloride, also known as phosgene, is preferred.

Also present during the co-reaction between the dihydric phenol, the carbonate precursor and the dicarboxylic acid or its reactive derivative are catalysts, molecular weight regulators, and acid acceptors. Examples of suitable molecular weight regulators include phenol, p-tertiary butyl phenol, etc. Examples of suitable catalysts include tertiary amines, quaternary ammonium compounds, quaternary phosphonium compounds, etc. Examples of suitable acid acceptors include tertiary amines alkali or alkaline earth metal hydroxides, etc.

The polyester-carbonates which are useful in the practice of the present invention are the aromatic polyester-carbonates derived from dihydric phenols, aromatic dicarboxylic acids or their reactive derivatives such as the aromatic acid dihalides, e.g. dichlorides, and phosgene. A quite useful class of aromatic polyester-carbonates are those derived from bisphenol A; terephthalic acid, isophthalic acid, or a mixture thereof or terephthaloyl dichloride, isophthaloyl dichloride, or a mixture thereof; and phosgene. If a mixture of terephthaloyl and isophthaloyl dichloride is utilized the ratio by weight of terephthaloyl dichloride to isophthaloyl dichloride is from about 5:95 to 95:5.

The instant invention is directed to novel flame retardant and non-dripping compositions containing, in admixture:

(a) an aromatic polyester-carbonate resin;
(b) at least one compound selected from organic alkali metal salts of sulfonic acid and organic alkaline earth metal salts of sulfonic acid; and
(c) a fluorinated polyolefin.

The fluorinated polyolefins used in this invention as drip retarding agents are commercially available or can be prepared by known processes. They are white solids obtained by polymerization of tetrafluoroethylene, for example, in aqueous media with free radical catalysts, e.g., sodium, potassium or ammonium peroxydisulfates at 100 to 1,000 psi at 0°–200° C. and preferably at 20°–100° C. See Brubaker, U.S. Pat. No. 2,393,967, which is incorporated herein by reference. While not essential, it is preferred to use the fluorinated polyolefins in the form of relatively large particles, e.g., of average size of 0.3 to 0.7 mm, mostly 0.5 mm. These are better than the usual polytetrafluoroethylene powders which have particles of from 0.05 to 0.5 millimicrons in diameter. It is especially preferred to use the relatively large particle size material because it tends to disperse readily in polymers and bond them together into fibrous materials. Such preferred polytetrafluoroethylenes are designated by ASTM as Type 3, and are available commercially from the E. I. DuPont de Nemour and Company under the tradename Teflon.

The amount of the fluorinated polyolefin used in the compositions of the present invention is a drip retarding amount. By this is meant an amount of fluorinated polyolefin effective to retard the dripping of flaming particles from a burning aromatic polyester-carbonate formed article. Generally this amount ranges from about 0.01 to about 3 weight percent based on the weight of the aromatic polyester-carbonate resin. Preferably the composition contains from about 0.02 to about 2 weight percent of the polyolefin based on the weight of the polyester-carbonate, and more preferably from about 0.05 to about 0.50 weight percent of the polyolefin.

The organic alkali metal salts of sulfonic acid and the organic alkaline earth metal salts of sulfonic acid employed herein are fully described in the following applications or patents:

(A) U.S. Pat. No. 3,933,734 to Victor Mark and Thomas J. Hoogeboom. This patent discloses a flame retardant polycarbonate composition comprising in admixture an aromatic carbonate polymer and a flame retardant additive which may be the metal salts of either monomeric or polymeric aromatic sulfonic acids, or mixtures thereof.

(B) U.S. Pat. No. 3,948,851 to Victor Mark. This patent discloses a flame retardant polycarbonate composition comprising in admixture an aromatic carbonate polymer and a flame retardant additive which may be the metal salts of either monomeric or polymeric aromatic sulfonesulfonic acids, or mixtures thereof.

(C) U.S. Pat. No. 3,926,908 to Victor Mark. This patent discloses a flame retardant polycarbonate composition comprising in admixture an aromatic carbonate polymer and a flame retardant additive which may be the metal salts of sulfonic acids of aromatic ketones, or mixtures thereof.

(D) U.S. Pat. No. 3,919,167 to Victor Mark. This patent discloses a flame retardant polycarbonate composition comprising in admixture an aromatic carbonate polymer and a flame retardant additive which may be the metal salts of heterocyclic sulfonic acids, or mixtures thereof.

(E) Application Ser. No. 429,125 filed Dec. 28, 1973 titled A Flame Retardant Polycarbonate Composition and assigned to the same assignee as the present application. This application discloses a flame retardant polycarbonate composition comprising in admixture an aromatic carbonate polymer and a flame retardant additive which may be the alkali metal salts of halogenated methanesulfonic acids or mixtures thereof, or mixtures of the alkali metal salts and the alkaline earth metal salts.

(F) U.S. Pat. No. 3,909,490 to Victor Mark. This Patent discloses a flame retardant polycarbonate composition comprising in admixture an aromatic carbonate polymer and a flame retardant additive which may be the metal salts of sulfonic acids of aromatic sulfides, or mixtures thereof.

(G) U.S. Pat. No. 3,953,396 to Victor Mark. This patent discloses a flame retardant polycarbonate composition comprising in admixture an aromatic carbonate polymer and a flame retardant additive which may be the metal salts of either monomeric or polymeric aromatic ether sulfonic acids, or mixtures thereof.

(H) U.S. Pat. No. 3,931,100 to Victor Mark. This patent discloses a flame retardant polycarbonate composition comprising in admixture an aromatic carbonate polymer and a flame retardant additive which may be the metal salts of aliphatic and olefinic sulfonic acids, and mixtures thereof.

(I) U.S. Pat. No. 3,978,024 to Victor Mark. This patent discloses a flame retardant polycarbonate composition comprising in admixture an aromatic carbonate polymer and a flame retardant additive which may be the metal salts of either monomeric or polymeric phenol ester sulfonic acid, or mixtures thereof.

(J) U.S. Pat. No. 3,953,399 to Victor Mark. This patent discloses a flame retardant polycarbonate composition comprising in admixture an aromatic carbonate polymer and a flame retardant additive which may be the metal salts of sulfonic acids of monomeric and polymeric aromatic carboxylic acids and esters, and mixtures thereof.

(K) U.S. Pat. No. 3,917,559 to Victor Mark. This patent discloses flame retardant polycarbonate compositions comprising in admixture an aromatic carbonate polymer and a flame retardant additive which may be the metal salts of halocycloaliphatic aromatic sulfonic acids, or mixtures thereof.

(L) U.S. Pat. No. 3,951,910 to Victor Mark. This patent discloses flame retardant polycarbonate compositions comprising in admixture an aromatic carbonate polymer and a flame retardant additive which may be the metal salts of either monomeric or polymeric aromatic amide sulfonic acids, or mixtures thereof.

(M) U.S. Pat. No. 3,940,366 to Victor Mark. This patent discloses a flame retardant polycarbonate composition comprising in admixture an aromatic carbonate polymer and a flame retardant additive which may be the metal salts of either monomeric or polymeric aromatic sulfonic acids, or mixtures thereof.

The above references A through M are incorporated herein by reference. The alkali or alkaline earth metal salts of these references as well as mixtures of any of the alkali or alkaline earth metal salts of any of these references may be used.

These salts are used in a flame retarding amount. By this is meant an amount of the salt effective to provide flame retardant properties to the aromatic polyester-carbonate composition. Generally, this amount ranges from about 0.01 to about 10 weight percent based on the weight of the aromatic polyester-carbonate resin, and preferably from about 0.1 to about 5 weight percent based on the weight of the aromatic polyester-carbonate resin, and more preferrably from about 0.2 to about 2%.

Preferred salts include sodium 2,4,5-trichlorobenzene sulfonate; sodium benzene sulfonate; disodium naphthalene-2,6-disulfonate; sodium p-iodobenzenesulfonate; sodium 4,4'-dibromobiphenyl-3-sulfonate; sodium 2,3,4,5,6-pentachlorobetastyrenesulfonate; sodium 4,4'-dichlorodiphenylsulfide-3-sulfonate; disodium tetrachlorodiphenyletherdisulfonate; disodium 4,4'-dichlorobenzophenone-3,3'-disulfonate; sodium 2,5- dichlorothiophene-3-sulfonate; sodium salt of diphenylsulfone-3-sulfonic acid; sodium dimethyl 2,4,6-trichloro-5-sulfoisophthalate; potassium salt of the sulfonic acid of dichlorophenyl 2,4,5-trichlorobenzene sulfonate; calcium salt of 2,4,5-trichlorobenzenesulfonanilide-4'sulfonate; sodium 4'(1,4,5,6,7,7-hexachlorobicyclo-[2.2.1]-hepta-5-en-endo-2-yl) benzenesulfonate. As mentioned previously these salts of sulfonic acids may be used alone or as mixtures of two or more different salts.

The flame retardant non-dripping compositions of the instant invention may optionally contain the commonly known and used additives such as antioxidants, antistatic agents, mold release agents, colorants, impact modifiers, ultraviolet light stabilizers, plasticizers, fillers, glass fibers, color stabilizers and hydrolytic stabilizers.

DESCRIPTION OF THE PREFERRED EMBODIMENT

The following examples are set forth to further illustrate the present invention and are not to be construed as limiting the invention thereto. Unless otherwise specified, where parts or percents are mentioned, they are parts or percents by weight.

EXAMPLE 1 (Control)

To a reactor fitted with a mechanical agitator are charged 6 liters of deionized water, 10 liters of methylene chloride, 1,910 grams (8.36 moles) of bisphenol A, 24 milliliters of triethylamine, 3.4 grams of sodium gluconate and 65 grams (0.43 mole) of p-tertiary butyl phenol. This reaction mixture is stirred and to the stirred mixture are added, over a 15 minute period, a mixture of 890 grams of terephthaloyl dichloride and 160 grams of isophthaloyl dichloride as a 25 weight percent solids solution in methylene chloride. During the acid chloride addition the pH is maintained in the range of 8.5 to 11.5 by the addition of 25% aqueous sodium hydroxide. The resulting reaction mixture is then phosgenated by the introduction of phosgene at the rate of 36 grams/minute for 15 minutes with the pH controlled at 9.5 to 12 by the addition of the aqueous sodium hydroxide. After phosgenation is terminated 6 liters of methylene chloride are added, the brine layer is separated by centrifuge and the resin solution is washed with aqueous acid and with water. The resin is steam precipitated and dried in a nitrogen fluid bed drier at approximately 240° F. To this resin product are added minor amounts (about 0.1 part by weight per hundred parts by weight of resin) of a phosphite color stabilizer mixed with an epoxy stabilizer. This stabilized resin product is then fed to an extruder operating at a temperature of about 600° F. to extrude the resin into strands and the extruded strands are chopped into pellets. The pellets are then injection molded at about 620° F. into test samples measuring about $2\frac{1}{2}'' \times \frac{1}{2}'' \times \frac{1}{8}''$.

Examples 2-7 illustrate compositions falling outside the scope of the instant invention because these compositions, while containing the alkali or alkaline earth metal salt of sulfonic acid, do not contain the fluorinated polyolefin.

EXAMPLE 2

To the aromatic polyester-carbonate prepared substantially in accordance with the procedure of Example 1 is added 0.25 parts by weight of sodium 2,4,5-trichlorobenzenesulfonate per hundred parts by weight of polyester-carbonate resin. The mixture is extruded and molded into test samples in the same manner as described in Example 1.

EXAMPLE 3

To the aromatic polyester-carbonate prepared substantially in accordance with the procedure of Example 1 is added 0.5 parts by weight of sodium 2,4,5-trichlorobenzenesulfonate per hundred parts by weight of polyester-carbonate resin. The mixture is extruded and molded into test samples in the same manner as described in Example 1.

EXAMPLE 4

To the aromatic polyester-carbonate prepared substantially in accordance with the procedure of Example 1 is added 0.75 parts by weight of sodium 2,4,5-trichlorobenzenesulfonate per hundred parts by weight of polyester-carbonate resin. The mixture is extruded and molded into test samples in the same manner as described in Example 1.

EXAMPLE 5

To the aromatic polyester-carbonate resin prepared substantially in accordance with the procedure of Example 1 is added 0.5 parts by weight of a mixture of (i) the potassium salt of diphenyl sulfone-3-sulfonic acid and (ii) the dipotassium salt of diphenyl sulfone-3,3'-disulfonic acid per hundred parts by weight of polyester-carbonate resin. The mixture is extruded and molded into test samples in the same manner as described in Example 1.

EXAMPLE 6

To the aromatic polyester-carbonate prepared substantially in accordance with the procedure of Example 1 is added 0.5 parts by weight of a mixture of (i) the potassium salt of diphenyl sulfone-3-sulfonic acid and (ii) the dipotassium salt of diphenyl sulfone-3,3'-disulfonic acid, and 1.5 parts by weight of fiber glass per hundred parts by weight of the polyester-carbonate resin. The mixture is extruded and molded into test samples in the same manner as described in Example 1.

EXAMPLE 7

To the aromatic polyester-carbonate prepared substantially in accordance with the procedure of Example 1 are added 0.5 parts by weight of a mixture of (i) the potassium salt of diphenyl sulfone-3-sulfonic acid and (ii) the dipotassium salt of diphenyl sulfone-3,3'-disulfonic acid, and 3.0 parts by weight of fiber glass per hundred parts by weight of polyester-carbonate resin. The mixture is extruded and molded into test samples in the same manner as described in Example 1.

Examples 8-10 are illustrative of the flame retardant non-dripping compositions of the instant invention.

EXAMPLE 8

To the aromatic polyester-carbonate prepared substantially in accordance with the procedure of Example 1 are added 0.75 parts by weight of sodium 2,4,5-trichlorobenzenesulfonate and 0.12 parts by weight of polytetrafluoroethylene per hundred parts by weight of polyester-carbonate resin. The mixture is extruded and molded into test samples in the same manner as described in Example 1.

EXAMPLE 9

To the aromatic polyester-carbonate prepared substantially in accordance with the procedure of Example 1 are added 0.5 parts by weight of sodium 2,4,5-trichlorobenzenesulfonate and 0.24 parts by weight of polytetrafluoroethylene per hundred parts by weight of polyester-carbonate resin. The mixture is extruded and molded into test samples in the same manner as described in Example 1.

EXAMPLE 10

To the aromatic polyester-carbonate prepared substantially in accordance with the procedure of Example 1 are added 0.75 parts by weight of sodium 2,4,5-trichlorobenzenesulfonate and 0.24 parts by weight of polytetrafluoroethylene per hundred parts by weight of polyester-carbonate resin. The mixture is extruded and molded into test samples in the same manner as described in Example 1.

The following examples illustrates a composition of the instant invention which also optionally contains fiber glass.

EXAMPLE 11

To the aromatic polyester-carbonate prepared substantially in accordance with the procedure of Example 1 are added 0.5 parts by weight of a mixture of (i) the potassium salt of diphenyl sulfone-3-sulfonic acid and (ii) the dipotassium salt of diphenyl sulfone-3,3'-disulfonic acid, 0.24 parts by weight of polytetrafluoroethylene, and 1.5 parts by weight of fiber glass per hundred parts by weight of polyester-carbonate resin. The mixture is extruded and molded into test samples in the same manner as described in Example 1.

The test samples prepared in Examples 1–11 are subjected to a test procedure to determine the flammability and dripping characteristics of these samples. This test procedure is a modified ASTM D-3713. The modification consists in that only 5 samples of each lot are tested and only for a 60 second flame impingement time. In accordance with this modified test procedure, materials so investigated are rated as either "passing" or "failing" based on the results obtained from the testing of 5 specimens. The criteria for passing or failing is briefly as follows:

"Passing": If a sample extinguishes within 30 seconds after removal of the igniting flame and none of the specimens drip flaming particles which ignite absorbent cotton placed 12" below.

"Failing": (i) Any one specimen failing to extinguish within 30 seconds after removal of the flame; and/or
(ii) Any one specimen produces flaming droplets—either during the period it is in contact with the flame or after removal of the flame—igniting absorbent cotton placed 12" below.

Furthermore, all 5 samples must pass in order to receive a passing rating. If any one of the 5 specimens fails, all five sample bars are considered as failing.

The results of this test are set forth in Table I.

The samples produced in Examples 8–11 are also subjected to the following test procedures;

Heat Distortion Temperature Under Load (DTUL) of the molded samples was determined according to ASTM D-648 modified by use of Example I type bars;

Notched Izod (NI) impact on the molded samples were determined according to ASTM D-256.

The results of these tests are set forth in Table II.

It is clear from the data in Table I that in order to obtain a passing rating under the procedures of ASTM D-3713 the polyester-carbonate composition must contain both the fluorinated polyolefin and the alkali or alkaline earth metal salt of sulfonic acid. However, it need not additionally contain glass fibers. This is in sharp contrast to polycarbonate compositions which in order to be rated passing under ASTM D-3713 must contain (i) a fluorinated polyolefin, (ii) an alkali or alkaline earth metal salt of sulfonic acid, and (iii) fiber glass.

TABLE I

| Example No. | Salt Additive | Parts of Salt Additive | Parts of Fluorinated Polyolefin | Parts of Fiber Glass | ASTM D-3713 Rating |
| --- | --- | --- | --- | --- | --- |
| 1 | none | none | none | none | Fail |
| 2 | STB* | 0.25 | none | none | Fail |
| 3 | STB | 0.5 | none | none | Fail |
| 4 | STB | 0.75 | none | none | Fail |
| 5 | KSS** | 0.5 | none | none | Fail |
| 6 | KSS | 0.5 | none | 1.5 | Fail |
| 7 | KSS | 0.5 | none | 3.0 | Fail |
| 8 | STB | 0.75 | 0.12 | none | Pass |
| 9 | STB | 0.5 | 0.24 | none | Pass |
| 10 | STB | 0.75 | 0.24 | none | Pass |
| 11 | KSS | 0.5 | 0.24 | 1.5 | Pass |

*STB is sodium 2,4,5-trichlorobenzenesulfonate.
**KSS is a mixture of the potassium salt of diphenyl sulfone-3-sulfonic acid and the dipotassium salt of diphenyl sulfone-3,3'-disulfonic acid.

TABLE II

| Example No. | DTUL (at 264 psi, °F.) | NI (ft. lb./in.) | ASTM D-3713 Rating |
| --- | --- | --- | --- |
| 8 | 328.8° F. | 6.1 | Pass |
| 9 | 326.8° F. | 5.1 | Pass |
| 10 | 328.8° F. | 5.2 | Pass |
| 11 | 333.3° F. | 3.7 | Pass |

This is just another indication of the aforementioned difference between polyester-carbonates and polycarbonates.

The data in Table II illustrates that these characteristics of flame retardancy and non-dripping are achieved without any significant adverse effects upon the other advantageous physical properties of the aromatic polyester-carbonate resin (the DTUL of the resin of Example 1 is 323° F. and the NI is 7.4 ft.lb./in.).

As previously mentioned the composition of the instant invention may optionally contain fiber glass. By fiber glass, it is understood that glass silk, as well as all glass fiber materials derived therefrom including glass fiber fabrics, rovings, stable fibers and glass fiber mats are included. The length of the glass filaments and whether or not they are bundled into fibers and the fibers bundled in turn to yarns, ropes or rovings, or woven into mats, and the like, also are not critical to the invention. However, when using fibrous glass filaments, they may first be formed and gathered into a bundle known as a strand. In order to bind the filaments into a strand so that the strand can be handled, a binder or binding agent is applied to the glass filaments. Subsequently, the strand can be chopped into various lengths as desired. It is convenient to use the strands in lengths of from about ⅛" to about 1" long, preferably less than ¼" in length. Preferably, the composition contains from about 1 to about 50 weight percent of the glass fibers.

It will thus be seen that the objects set forth hereinabove among those made apparent from the preceding description, are efficiently attained, and since certain changes may be made in carrying out the above process and in the compositions set forth without departing from the scope of the invention, it is intended that all matters contained herein shall be interpreted as illustrative and not in a limiting sense.

As used throughout this specification and claims, the minimum amount of residue from the dicarboxylic acid or dicarboxylic acid reactive derivative present in the copolyester-carbonate is about 25 mole percent, the mole percentage based upon the moles of diphenol residue present in the copolyester-carbonate. Since the reactions for preparing the polyestercarbonate go essentially to completion, the mole percent of residue in the copolyester-carbonate is essentially the same as the mole percent of reactants. A range of about 25 to about 90 mole percent dicarboxylic acid or dicarboxylic acid reactive derivative residue is generally appropriate. A preferred range is from about 35 to about 80 mole percent.

What is claimed is:

1. An aromatic copolyester carbonate composition which obtains a pass rating under the procedures of a modified ASTM D-3713 consisting essentially of in admixture
   (i) a nonhalogenated aromatic copolyester carbonate derived from a dihydric phenol, an aromatic dicarboxylic acid, reactive derivative of an acid or mixtures thereof, and a carbonate precursor, said aromatic dicarboxylic acid or reactive derivative thereof being present as residue in the aromatic polyestercarbonate in a mole percent of from about 25 to about 90 mole percent based on the moles of dihydric phenol;
   (ii) a flame retardant effective amount of at least one compound selected from the group consisting of alkali metal salts of an organic sulfonic acid and alkaline earth metal salts of organic sulfonic acid;
   (iii) an anti-dripping effective amount of a type 3 fluorinated polyolefin; and
   (iv) the essential absence of glass fibers.

2. The composition of claim 1 wherein said alkali metal salts of organic sulfonic acid and alkaline earth metal salts of organic sulfonic acid are derived from acid selected from the group consisting of:
   unsubstituted monomeric or polymeric sulfonic acids;
   monomeric or polymeric aromatic sulfonesulfonic acids;
   sulfonic acids of aromatic ketones;
   heterocyclic sulfonic acids;
   sulfonic acids of aromatic sulfides;
   monomeric or polymeric aromatic ether sulfonic acids;
   olefinic sulfonic acids;
   monomeric or polymeric phenol ester sulfonic acids;
   sulfonic acids of monomeric and polymeric aromatic carboxylic acids and esters;
   halocycloaliphatic aromatic sulfonic acids;
   monomeric or polymeric aromatic sulfonic acids; and mixtures thereof.

3. The composition of claim 2 wherein said fluorinated polyolefin is polytetrafluoroethylene.

4. The composition of claim 3 wherein said amount of polytetrafluoroethylene is from about 0.05 to about 0.5 weight percent based on the weight of the polyester-carbonate resin.

5. The composition of claim 2 wherein said flame retardant amount is from about 0.2 to about 2 weight percent based on the weight of the polyester-carbonate resin.

6. The composition of claim 1 wherein said dihydric phenol is bisphenol-A.

7. The composition of claim 6 wherein said carbonate precursor is phosgene.

8. The composition of claim 7 wherein the copolyester-carbonate is derived from a reactive derivative of dicarboxylic acid and said reactive derivative is selected from the group consisting of isophthaloyl dichloride, terephthaloyl dichloride, and mixtures thereof.

9. The composition in accordance with claim 8 wherein the dicarboxylic acid reactive derivative residue is present in the aromatic copolyester-carbonate in a mole percent of from about 35 to about 80 mole percent.

10. The composition of claim 1 wherein the alkali metal salt of organic sulfonic acid is sodium 2,4,5-trichlorobenzenesulfonate.

11. An aromatic copolyester-carbonate composition which obtains a pass rating under the procedures of a modified ASTM D-3713 consisting essentially of in admixture
    (i) an non-halogenated aromatic copolyester carbonate derived from a dihydric phenol, an aromatic dicarboxylic acid or reactive derivative thereof, and a carbonate precursor, said aromatic dicarboxylic acid or reactive derivative thereof being present in the aromatic polyestercarbonate in a mole percent of from about 25 to about 90 mole percent based on the moles of dihydric phenol;
    (ii) a flame retardant effective amount of at least one compound selected from the group consisting of alkali metal salts of an organic sulfonic acid and alkaline earth metal salts of organic sulfonic acid;
    (iii) an anti-dripping effective amount of a type 3 fluorinated polyolefin.

* * * * *